3,231,589
13β-ALKYL-4-GONEN-3-ONES
George Greenspan, Narberth, Leland L. Smith, Malvern, Theodore J. Foell, King of Prussia, and Richard Rees, Newtown Square, Pa., assignors to American Home Products Corporation, New York, N.Y., a corporation of Delaware
No Drawing. Filed July 25, 1963, Ser. No. 297,706
7 Claims. (Cl. 260—397.4)

This invention relates to the oxidation of steroids and more particularly relates to a microbiological process for the preparation of new hydroxylated steroids which have valuable therapeutic properties. Specifically, the new compounds of the present invention are useful for their androgenic activity. Additionally, the invention encompasses a series of new compounds intermediate to the new products of this invention.

It has now been found possible according to the method of the present invention to oxidize selected steroids of the gonane series by means of microorganisms and to utilize the products thereof as a means of preparing resolved forms of the racemic mixtures of the starting steroid compounds. More specifically, it has been found according to the present invention that if dl-steroids of the 13β-alkyl-4-gonen-3-one series corresponding to those encompassed within Formula I and its mirror image which follows are subjected to microbiological fermentation in a manner hereinafter described, new compounds are obtained which are resolved derivatives of the dl-racemic mixture.

In its broadest aspect, the compounds and the process of the present invention may be illustratively represented by the following sequence of formulae:

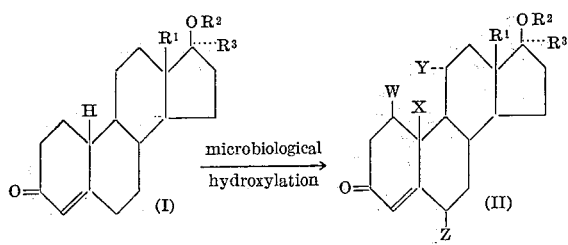

wherein $R^1$ is alkyl; $R^2$ is selected from the group consisting of hydrogen and acyl; $R^3$ is selected from the group consisting of hydrogen, alkyl, alkenyl and alkynyl; and X is selected from the group consisting of H and OH and W, Y, and Z are selected from the group consisting of H, OH and $OR^4$ wherein $R^4$ is lower acyl all under the proviso that when one of W, Y and Z is selected from the group consisting of OH and $OR^4$ the remainder of this group and X are H; and when X is H, one of W, Y and Z is selected from the group consisting of OH and $OR^4$ and the remainder of this group are H; and when X is OH, W, Y and Z are H; and when W is OH, the representation of structure of the product is a mirror image of II.

In the foregoing reaction sequence, the starting materials encompassed within Formula I are racemic and are resolved into specific d or l isomers. In the examples which follow, it will be noted that the products vary in their optical activity. Those steroid products substituted in the 1β-position (i.e., W of Formula II) rotate the plane of polarized light and are characterized as having unnatural configuration. The steroid products substituted at 10β, 6β and 11α position, wherein $R^1$ is other than methyl (i.e., X, Z and Y respectively of Formula II), are d or dextrorotatory and are identified as having natural configuration. In the foregoing structures encompassed within II, wherein $R^1$ is methyl and X is OH, the steroid is of unnatural configuration.

The lower alkyl groups identified by $R^1$ and $R^3$ preferably include methyl, ethyl, propyl, isopropyl, butyl, isobutyl and similar groups. The acyl group identified by $R^2$ is derived from carboxylic acids preferably having less than 12 carbon atoms in saturated or unsaturated, straight, branched, cyclic or mixed aliphatic-cyclic configuration. Typical suitable esters include the acetate, propionate, butyrate, valerate, hemisuccinate, enanthate, caproate, benzoate and the like. The alkenyl and alkynyl groups represented by $R^3$ include but are not limited to vinyl, ethynyl, propynyl and the like.

As is evident, the new compounds of the present invention identified by Formula II are characterized in being hydroxylated according to the method of the present invention at the 1β-, 10β-, 6β-, or 11α-positions, thus resulting in dihydroxy-4-gonen-3-ones. It is to be understood, with respect to the compounds encompassed within Formula II, that only one of W, X, Y or Z will be hydroxylated or acylated in a single species, under which circumstance the remaining positions at 1, 6, 10 or 11, depending on the particular position to which the hydroxyl or acyl group is attached, will be hydrogenated. As will be more completely described hereinafter, one of the unique and important features of the present invention is that the method thereof is capable of producing simultaneously, in varying amounts, the various species of hydroxylation, i.e., the 1β-, 6β-, 10β- and 11α-hydroxylated-4-gonen-3-ones encompassed within Formula II.

In the process of the present invention, hydroxylation of the racemic mixture I is accomplished as has been suggested by the use of a selected microbiological organism. The genus Aspergillus has been found useful for this purpose, with the species Aspergillus ochraceus being preferred. More specifically it has been found that A. ochraceus NRRL 405 is uniquely adapted to effect the hydroxylation of the present invention. As has been previously suggested, the introduction of the hydroxyl group by A. ochraceus occurs predominantly at the 1-position and is β in orientation when $R^1$ is ethyl, propyl or higher alkyl. When $R^1$ is methyl hydroxylation occurs predominantly at the 11α position. That is to say, that in the fermentation by the fungus the major product will be of the structure identified by compound VII in the reaction sequence which follows. Simultaneously as is described above and in greater detail hereafter, hydroxylation also occurs at the 10β-, 6β-, and 11α-positions. These additional resolved products are graphically set forth below and identified as III, IV and V. The specific compounds are identified merely to suggest typical steroids that are obtainable according to the method of the present invention.

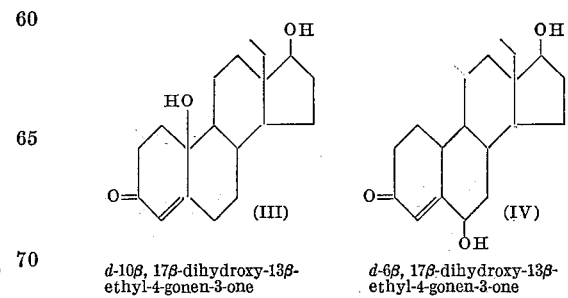

d-10β, 17β-dihydroxy-13β-ethyl-4-gonen-3-one d-6β, 17β-dihydroxy-13β-ethyl-4-gonen-3-one

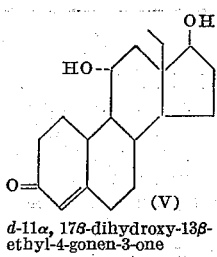

d-11α, 17β-dihydroxy-13β-
ethyl-4-gonen-3-one

While the foregoing formulae identify the 13β-ethyl-4-gonen-3-one class for convenience, it must be recognized that the invention encompasses those reactions and reaction products preparable according to the method described falling within the broader class represented by Formula II above.

The starting racemic materials identified by Formula I above, utilized in preparing the new compounds of the present invention, are preferably prepared according to the method described in the copending application Serial Number 228,384, filed October 4, 1962, and Belgian Patents 623,844, 608,370 and 608,369 and patents cited therein. Therein the synthesis of the compounds falling within the class identified by Formula I are fully described together with the physical characteristics of such compounds.

As has been previously described, treating a selected steroid of the structure of Formula I according to the method of the present invention results in new steroids which are uniquely resolved. The reaction sequence by which a resolved form of the racemic starting material can be obtained is represented by the following reaction sequence wherein Formulae VII–XI are understood to be mirror images of the structure represented.

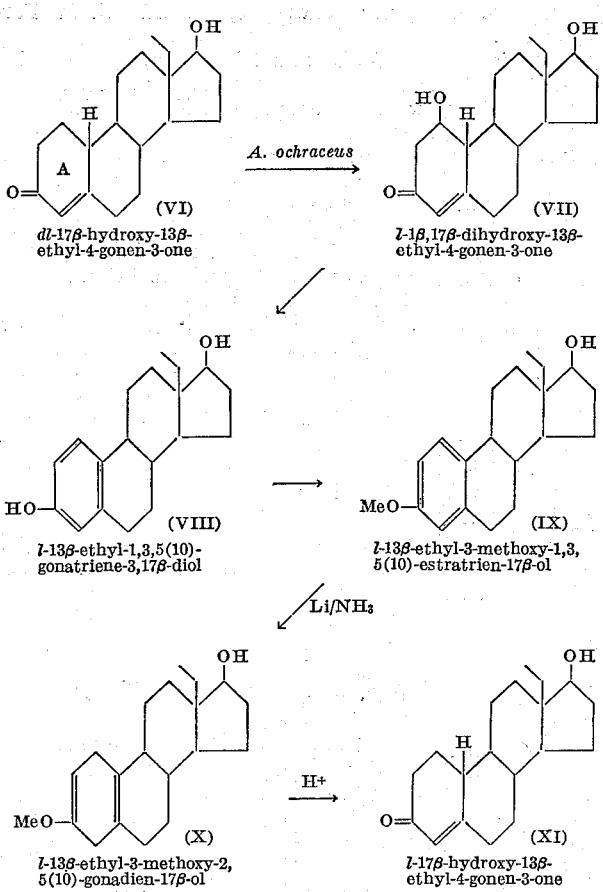

As is evident from the foregoing sequence of reactions, the *A. ochraceus* fermentation process produces the dihydroxy-13-substituted-4-gonen-3-one (VII). Dehydration with alkali of the product VII results in compound VIII which on treatment with base and dimethyl sulfate results in the 3-methoxy-1,3,5(10)-gonatriene IX. The latter on treatment with lithium and ammonia produces the steroid X which thereafter on treatment with mineral acid according to conventional technique results in the resolved laevo (l) form of compound XI of the starting dl racemic VI.

The novel compounds encompassed within those defined by Formula II are, as has been described, useful for their androgenic properties; and, when it is contemplated that they be used for this purpose, these new compounds are conveniently employed in combination with compatible and therapeutically administrable carriers, diluents, excipients and the like. Suitable liquid carries include lower alcohols, polyalcohols such as glycol, mineral oil and the like. Additionally, conventional carriers such as methylcellulose, carboxymethylcellulose, starch, sugar and the like can be used. The compositions may, of course, be used in liquid, powder or tablet form as desired. The amount of the new compound administered for the purposes defined may vary, depending on the requirements, but will normally be administered in an amount of from about 0.5 to about 200 mg./kilo of body weight.

As has been suggested, the fermentative oxidation process of the present invention utilizes a microorganism of the type *A. ochraceus* such as for example NRRL 405 or QM 6731. The foregoing microorganisms are obtainable from known sources such as the Northern Regional Research Laboratories, Peoria, Illinois, or the Quartermaster Culture Collection, Natick, Massachusetts. The microorganisms are, of course, also obtainable by isolating the same from natural sources by standard microbiological techniques.

In carrying out the process of the present invention, aerobic conditions are maintained in the presence of a suitable nutrient medium in temperature in the range of from about 15° C. to about 37° C. in the presence of the fungal species referred to. The reaction to prepare a given quantity of the 1-hydroxy steroid is normally complete within a period of from within a few hours to about 80 hours. During the growth of the organism under suitable conditions in the presence of a steroid unsubstituted at the C–1 position, hydroxylation takes place in that position of steroid ring A.

*A. ochraceus* NRRL 405 can be grown on a dextrose, peptone, corn steep liquor, salts medium at a temperature of about 28° C. for a period of about 64 hours. Suitable nutrient media which may also be used include a yeast extract-dextrose medium or a malt extract-yeast extract-dextrose medium. Other suitable media which contain the necessary carbon, nitrogen and mineral elements, in the form of carbon include sugars such as glucose, sucrose, maltose, xylose, galactose and so forth; alcohols such as glycerol or mannitol; organic acids such as citric acid, maleic acid, acetic acid and various other natural products containing carbohydrates such as corn starch, corn steep liquor, soya bean meal, cotton seed meal and many available materials which have been described heretofore as a source of carbon in steroid fermentation processes. Usually a variety of carbon sources can be employed in the medium with good results. Suitable sources of nitrogen include a number of the above named materials such as corn steep liquor, soya bean meal, cotton seed meal and various substances such as beef extract, casein, yeast, enzymatically digested proteins, degradation products including peptones, amino acids and many other available proteinaceous materials which have been found to be suitable in supporting the growth of fungi. Inorganic sources of nitrogen include ammonium salts and nitrates which may also be used in the medium as a source of nitrogen to provide a favorable growth medium for the organism.

The mineral requirements of fermentation are usually supplied in the crude materials which are often used as sources of carbon and nitrogen or water that is used in the process. However, it may be advisable to supplement the minerals normally present with added amounts to obtain maximum growth. Cations and anions which may be desirable in added amounts include sodium, potassium, calcium, magnesium, phosphate, sulfate, chloride, cobalt, manganese and various others. The use of elements such as boron, copper, cobalt, molybdenum and chromium is often desirable.

The growth of the organism takes place under aerobic conditions, and aeration in flasks, for example, can be achieved by agitation on a reciprocating or rotary shaker or in bottles or tanks by forcing sterile air through the fermentation mixture. It is desirable that the sterile air be forced through the medium in an amount of from ½ to 2 volumes of air per volume of medium per minute. Agitation in the bottles or fermenter tanks is provided by mechanical impeller. It is preferable to carry out the process of the present invention at a temperature within the range of about 15° C. to about 37° C.

To obtain large working quantities of the culture $A$. $ochraceus$ NRRL 405, the following method may be used. Seven flasks of a corn steep liquor-peptone-dextrose-salts medium, 100 ml. in 500 ml. flasks, are inoculated with a spore suspension prepared from agar slant growth of $A$. $ochraceus$ NRRL 405. The flasks are incubated at 28° C. on a rotary shaker, 250 r.p.m., 2″ diameter of rotation, for 64 hours. Ten percent transfers are then made to 12 2-liter flasks, each with 400 ml. of the same medium. After 24 hours of incubation as above, 240 mg. of a selected steroid dissolved in 8 ml. of methanol is added to each flask. Incubation is then continued for 30 hours at which time the flasks are harvested for extraction.

After the growth of the microorganism has taken place to some extent, the steroids are added to the fermentation in solution or finely divided form. One of the preferred methods is to dissolve the steroid in methanol or other water-miscible solvents and add it to the fermentation medium at the desired stage in the process. Although the steroid may precipitate from solution when so added, it is dispersed through the medium as a fine suspension and becomes readily available to the organism for oxidation. The amount of steroid added to the fermentation medium may vary considerably but is generally about $\frac{1}{10}$ to 1 gram per liter of medium.

During the fermentation process, it may be desirable to add anti-foaming agents such as silicones and glyceride oils. These compounds are added from time to time as needed. The fermentation is allowed to proceed for a period of time long enough to achieve maximum conversion of the steroid to the 1-hydroxy product.

When maximum conversion to the 1-hydroxy product is obtained, the desired 1-hydroxylated steroid is recovered from the fermentation by extracting with ethyl acetate. The ethyl acetate extracts are concentrated under vacuum and the latter extracted with boiling hexane. The hexane insoluble solids then contain the desired product which will generally correspond to the structure and configuration of Formula VII. Alternatively, the product obtained by fermentation with $A$. $ochraceus$ is extracted a number of times such as for example 3 times or more with ethyl acetate and the combined extracts evaporated under vacuum. The residue is then slurried with hot acetone and filtered after a period of from ½ to 2 hours. A portion of the desired product is present as the filtered material and by evaporation of the filtrates additional product is obtained which may be recrystallized from alcohol if desired.

In order to obtain products of the type represented by Fomulae III, IV and V, which are produced simultaneously with the 1β-hydroxy product, but in lesser amount, the recovery is made from the mother liquor remaining after removal of the 1β-hydroxy product by crystallization.

Product identification following fermentation is accomplished by chromatography in which a portion of the extract is spotted on filter paper. The paper is subjected to chromatography with a solvent such as for example the bush C. (i.e., Bush, Biochem. J. 50, 370, 1952) solvent system with detection being made by means of ultraviolet light absorption.

The method of the present invention and the products obtainable thereby will be more clearly understood by reference to the specific examples which follow:

*Example I*

A spore suspension of $A$. $ochraceus$ NRRL 405 grown on an agar slant is utilized to inoculate a 250 ml. flask with 50 ml. of medium of the following composition (German Patent 1,009,627) in which the ingredients are measured in grams, on a gram per liter basis: dextrose 50 g., peptone 20 g., corn steep liquor 5 g., and distilled $H_2O$ 1,000 ml. To each 50 ml. of the previous mixture, there is added, on a gram per liter basis, 1 ml. of the following composition: $Ca(NO_3)_2 \cdot 4H_2O$ 14.6 g., $KH_2PO_4$ 5 g., KCl 10 g., $MgSO_4 \cdot 7H_2O$ 10 g., $FeSO_4$ 1 g., $MnSO_4 \cdot H_2O$ 3 g. and distilled $H_2O$ 1 liter.

The flask is incubated on a rotary shaker, 250 r.p.m., 28° C. for 64 hours, following which a 10 percent transfer is made to flasks of the same medium. After 24 hours of incubation as above, $dl$-17β-hydroxy-13β-ethyl-4-gonen-3-one, 30 mg. dissolved in 1 ml. of methanol, is added to the flask and the incubation continued for an additional 23 hours. A 5 ml. sample of the whole broth is then equilibrated with 1 ml. of methyl isobutyl ketone and the extract spotted on whatman No. 4 filter paper. The sheet is chromatographed in the Bush C solvent system (toluene, ethyl acetate, methanol, water, 9:1:5:5) and the products formed detected by ultraviolet light absorption. The major product is the 1-hydroxy derivative.

Six liters of broth obtained by the fermentation of 3 g. of racemic 17β-hydroxy-13β-ethyl-4-gonen-3-one (VI) with $A$. $ochraceus$ is extracted with 1.5 l. of ethyl acetate three times. The extracts are combined and evaporated under vacuum. The residue is slurried with 75 ml. of hot acetone, and the slurry filtered after an hour. The solids thus obtained weigh about 550 mg. By evaporation of the mother liquors, an additional 326 mg of $l$-1β,17β-dihydroxy-13β-ethyl-4-gonen-3-one (VII) is obtained, both fractions being identifiable as homogeneous products by thin-layer chromatography. Further concentration of the mother liquors gives 50 mg. of product.

Recrystallization of the first crop of product from methanol several times gives the analytical sample, M.P. 198–200° C. (Kofler); $[\alpha]_D$ +66.9° (1% in ethanol); $\lambda_{max}$ 243 m$\mu$ ($\epsilon$ 15.500);

$\lambda_{max}^{KBr}$ 2.90$\mu$, 3.03$\mu$, 6.03$\mu$, 6.14$\mu$, 6.80$\mu$, 6.94$\mu$, 7.13$\mu$, 7.33$\mu$, 7.53$\mu$, 7.78$\mu$, 7.95$\mu$, etc.

*Anal.*—Calc. for $C_{19}H_{28}O_2$: C, 74.95; H, 9.27. Found: C, 74.54; H, 8.95.

*Example II*

To prepare $l$-1β,17β-diacetoxy-13β-ethyl-4-gonen-3-one, a solution of $l$-1β,17β-dihydroxy-13β-ethyl-4-gonen-3-one in 3 ml. of pyridine is treated with 0.95 ml. of acetic anhydride. The solution is allowed to stand overnight, after which time the solvents are removed under vacuum. The residue is crystallized from ether, and several crystalline fractions are taken: 29.4 mg., 100.6 mg., 14.8 mg., 131.4 mg., all of which are shown to be the 1,17β-diacetate by thin-layer chromatography. The first two fractions, 130 mg., are combined and recrystallized from ether-hexane to give the analytical sample, M.P. 149–152° C., resolidifying and remelting 230–232° C.; $[\alpha]_D$ +67.9° (chloroform);

$\lambda_{max}$ 241 m$\mu$ ($\epsilon$ 17,000); $\lambda_{max}^{KBr}$ 5.77$\mu$, 5.98$\mu$, 6.15$\mu$, etc.

*Anal.*—Calc. for $C_{23}H_{32}O_5$: C, 71.10; H, 8.30. Found: C, 71.18; H, 8.39.

Example III

To prepare $l$-1$\beta$,17$\beta$-dihydroxy-17$\alpha$-ethyl-13$\beta$-propyl-4-gonen-3-one, 13$\beta$-propyl-17$\beta$-hydroxy-17$\alpha$-ethyl-4-gonen-3-one is fermented with *A. ochraceus* NRRL 405 according to the method previously described in Example I.

Example IV

To prepare $d$-6$\beta$,17$\beta$-dihydroxy-17$\alpha$-propyl-13$\beta$-ethyl-4-gonen-3-one, 13$\beta$-ethyl-17$\beta$-hydroxy-17$\alpha$-propyl-4-gonen-3-one is fermented by *A. ochraceus* NRRL 405 as previously described in Example I.

Example V

Mother liquors from which the product of Example I, $l$-13$\beta$-ethyl-1$\beta$,17$\beta$-dihydroxy-4-gonen-3-one, had been removed by crystallization are combined and dispersed in water. The aqueous dispersion is extracted with petroleum ether, then with petroleum ether-ether (1:1), to remove lipids. The steroidal components are then extracted with ether, chloroform-ether (1:1), and chloroform. These extracts are combined and evaporated under reduced pressure, yielding 20 g. of mixed crude steroids, which are chromatographed on 800 g. of silica gel, taking 1.5 l. fractions with benzene-ethyl acetate mixtures. The following fractions are obtained:

| Fraction | Benzene-Ethyl Acetate Ratio | Product Isolated |
| --- | --- | --- |
| 1–12 | 9:1 | Non-steroidal. |
| 13–22 | 2:1 | 420 mg. |
| 32–48 | 4:1 | Substrate. |
| 66–84 | 4:1 | 610 mg. III. |
| 85–110 | 4:1 | 3.4 g. mixed III, IV. |
| 111–123 | 3:2 | 810 mg. IV. |
| 124–129 | 3:2 | 240 mg. mixed IV, V. |
| 130–141 | 3:2 | 410 mg. V. |

Elution with pure ethyl acetate affords 900 mg. of an oil from which 70 mg. of VII is recovered.

The material eluated from fractions 66–84 above is obtained after removal of the solvent under vacuum, affording 610 mg. of pure product. The product, $d$-13$\beta$-ethyl-10$\beta$,17$\beta$-dihydroxy-4-gonen-3-one (III), is recrystallized from ethyl acetate, giving analytically pure material, M.P. 224–227° C., $[\alpha]_D$ +66.5° (1% chloroform); $\lambda_{max}$ 236 m$\mu$ ($\epsilon$ 13,820).

Material eluted from Fractions 111–123 above is obtained by evaporation of the solvent under vacuum. The crystalline product, $d$-13$\beta$-ethyl-6$\beta$,17$\beta$-dihydroxy-4-gonen-3-one (IV), is further recrystallized from ethyl acetate, yielding the analytically pure product M.P. 191–195° C., $[\alpha]_D$ −75.0° (1%, chloroform), $\lambda_{max}$ 237.5 m$\mu$ ($\epsilon$ 13,930).

Material obtained from the ethyl acetate washings of the column is recrystallized from ethyl acetate, yielding pure $d$-13$\beta$-ethyl-11$\alpha$,17$\beta$-dihydroxy-4-gonen-3-one (V), M.P. 215–217° C., $\lambda_{max}$ 242 m$\mu$ ($\epsilon$ 15,325).

Example VI

To prepare $l$-1$\beta$,17$\beta$-dihydroxy-13$\beta$-n-butyl-17$\alpha$-ethynyl-4-gonen-3-one according to the method of the present invention, 13$\beta$-n-butyl-17$\alpha$-ethynyl-17$\beta$-hydroxy-4-gonen-3-one is fermented with *A. ochraceus*.

Example VII

According to the method of the previous examples, 13$\beta$-n-propyl-17$\alpha$-(1-methallyl)-17$\beta$-hydroxy-4-gonen-3-one is fermented with *A. ochraceus* to produce $l$-1$\beta$,17$\beta$-dihydroxy-13$\beta$-n-propyl-17$\alpha$-(1-methallyl)-4-gonen-3-one.

Example VIII

According to the method of the previous examples, 13$\beta$-n-propyl-17$\alpha$-propynyl-17$\beta$-hydroxy-4-gonen-3-one is fermented with *A. ochraceus* to produce $l$-1$\beta$,17$\beta$-dihydroxy-13$\beta$-n-propyl-17$\alpha$-propynyl-4-gonen-3-one.

Example IX

To prepare $l$-1$\beta$,17$\beta$-dihydroxy-13$\beta$-n-propyl-17$\alpha$-vinyl-4-gonen-3-one according to the method of the previous examples, 13$\beta$-n-propyl-17$\alpha$-vinyl-17$\beta$-hydroxy-4-gonen-3-one is fermented with *A. ochraceus*.

Example X

To prepare $l$-1$\beta$,17$\beta$-dihydroxy-13$\beta$-propyl-4-gonen-3-one, 10 l. of broth obtained by the fermentation with *A. ochraceus* of 6.5 g. of $dl$-17$\beta$-hydroxy-13$\beta$-propyl-4-gonen-3-one is extracted with 8 l. of ethyl acetate. The mixture is filtered through Celite filter aid, and the layers separated. The aqueous layer is re-extracted with 8 l. of ethyl acetae. Each ethyl acetate extract is washed with 1 liter of water; the spent mycelium is extracted with 2 l. of ethyl acetate. The three ethyl acetate extracts are combined and concentrated in vacuum to a dark oil. The material is dissolved in chloroform-methanol (1:1), filtered, and the solvent evaporated. The residue is dissolved in ethyl acetate and ether added. After standing overnight the solids precipitated are filtered, yielding 700 mg. of crystalline product. Recrystallization from methanol several times gives the analytical sample, M.P. 216–220° C.; $[\alpha]_D$ +47.3° (1% in methanol-chloroform, 1:1); $\lambda_{max}$ 243.5 m$\mu$ ($\epsilon$ 15,147);

$$\lambda_{max}^{KBr}\ 2.87\mu,\ 3.01\mu,\ 3.43\mu,\ 6.00\mu,\ 6.14\mu.$$

*Anal.*—Calc. for $C_{20}H_{30}O_3$: C, 75.43; H, 9.50. Found: C, 75.16; H, 9.65.

Example XI

The method carried out with the starting material and according to the method of Example I in which the medium used consists of yeast-extract 1%, dextrose 1% and distilled water 100 ml.

Example XII

13$\beta$-ethyl-17$\alpha$-ethynyl-17$\beta$-hydroxy-4-gonen-3-one is fermented with *A. ochraceus* NRRL 405 to produce $l$-1$\beta$,17$\beta$-dihydroxy-13$\beta$-ethyl-17$\alpha$-ethynyl-4-gonen-3-one.

Example XIII

13$\beta$,17$\alpha$-diethyl-17$\beta$-hydroxy-4-gonen-3-one is fermented with *A. ochraceus* NRRL 405 according to the method of the previous examples to produce $d$-6$\beta$,17$\beta$-dihydroxy-13$\beta$,17$\alpha$-diethyl-4-gonen-3-one.

Example XIV

To prepare $l$-1$\beta$,17$\beta$-diacetoxy-13$\beta$-propyl-4-gonen-3-one, 1$\beta$,17$\beta$-dihydroxy-13$\beta$-propyl-4-gonen-3-one is treated with acetic anhydride in the presence of pyridine according to the method of Example VI.

Example XV

To prepare $d$-6$\beta$,17$\beta$-diacetoxy-13$\beta$-ethyl-17$\alpha$-methyl-4-gonen-3-one, 6$\beta$,17$\beta$-dihydroxy-13$\beta$-ethyl-17$\alpha$-methyl-4-gonen-3-one is refluxed with two equivalents of acetic anhydride in the presence of p-toluene sulfonic acid catalyst for about one hour the solution neutralized and the product recovered.

Example XVI

To prepare $l$-1$\beta$-acetoxy-13$\beta$,17$\alpha$-diethyl-17$\beta$-hydroxy-4-gonen-3-one, one hundred milligrams of $l$-13$\beta$,17$\alpha$-diethyl-1$\beta$,17$\beta$-dihydroxy-4-gonen-3-one is dissolved in five milliliters of a mixture of three parts pyridine and one part acetic anhydride. After twenty hours, the solution is cautiously diluted with 20 ml. of methanol and the solvents are removed under vacuum. The residue is dissolved in methanol and re-evaporated several times, and the solids thereby obtained are recrystallized from methanol, yielding the purified product.

Example VII

To prepare $d$ - $17\beta$ - acetoxy - $13\beta$ - ethyl - $10\beta$ - hydroxy-4-gonen-3-one, one hundred milligrams of $d$-$13\beta$-ethyl - $10\beta$—$17\beta$ - dihydroxy - 4 - gonen - 3 - one is dissolved in five milliliters of dry pyridine and one milliliter of acetic anhydride is added. The solution is allowed to stand for fifteen hours, after which time the solvents are removed under vacuum. The residue is repeatedly dissolved in methanol and evaporated under vacuum until the odor of the reagents is removed, and the residue is then recrystallized several times from methanol, yielding the purified $d$-$17\beta$-acetoxy-$13\beta$-ethyl-$10\beta$-hydroxy-4-gonen-3-one.

Example XVIII

To prepare $d$-$11\alpha,17\beta$-diacetoxy-$13\beta$-butyl-4-gonen-3-one, $11\alpha,17\beta$ - dihydroxy - $13\beta$ - butyl - 4 - gonen - 3 - one is treated with acetic anhydride according to the method of Example XV.

While the compounds and method of the present invention have been described with some degree of particularity in the foregoing discussion and in the examples, it is to be understood that nothing contained therein is in anyway to be construed as a limitation on the scope of this invention. The latter is to be limited only by the claims appended hereto.

The invention claimed is:
1. $l$ - $1\beta,17\beta$ - di - lower acyloxy - $13\beta$ - lower alkyl-4-gonen-3-one.
2. $l$ - $1\beta,17\beta$ - diacetoxy - $13\beta$ - ethyl - 4 - gonen - 3-one.
3. $l$ - $1\beta$ - lower acyloxy - $13\beta,17\alpha$ - diethyl - $17\beta$-hydroxy-4-gonen-3-one.
4. $l$ - $1\beta,17\beta$ - dihydroxy - $13\beta$ - lower alkyl - 4 - gonen-3-one.
5. $l$ - $1\beta,17\beta$ - dihydroxy - $13\beta$ - ethyl - $17\alpha$ - ethynyl-4-gonen-3-one.
6. $l$ - $1\beta,17\beta$ - dihydroxy - $13\beta$ - propyl - 4 - gonen - 3-one.
7. $l$ - $1\beta,17\beta$ - dihydroxy - $13\beta$ - ethyl - 4 - gonen - 3-one.

References Cited by the Examiner
UNITED STATES PATENTS

| | | | |
|---|---|---|---|
| 2,602,769 | 7/1952 | Murray et al. | 195—51 |
| 2,666,016 | 1/1954 | Hechter et al. | 195—51 |
| 2,708,672 | 5/1955 | Magerlein et al. | 260—397.45 |
| 2,714,599 | 8/1955 | Konken et al. | 260—397.45 |

OTHER REFERENCES

Pederson et al., J.A.C.S. 78, pp. 1512–13 (1956).

LEWIS GOTTS, *Primary Examiner.*